United States Patent [19]

Kan et al.

[11] Patent Number: 4,772,526

[45] Date of Patent: Sep. 20, 1988

[54] ELECTROPHOTOGRAPHIC ELEMENT

[75] Inventors: Hsin-Chia Kan, Fairport; Joseph A. Pavlisko, Pittsford, both of N.Y.

[73] Assignee: Eastman Kodak Company, Rochester, N.Y.

[21] Appl. No.: 107,602

[22] Filed: Oct. 13, 1987

[51] Int. Cl.$^4$ .................. G03G 5/05; G03G 5/087
[52] U.S. Cl. .......................... 430/58; 430/96; 528/202; 528/199
[58] Field of Search ............... 430/96, 58; 528/202, 528/199

[56] References Cited

U.S. PATENT DOCUMENTS

| | | | |
|---|---|---|---|
| 3,975,352 | 8/1976 | Yoerger et al. | 260/33.8 F |
| 4,030,921 | 6/1977 | Akira et al. | |
| 4,284,699 | 8/1981 | Berwick et al. | 430/58 |
| 4,309,497 | 1/1982 | Lelental et al. | 430/48 |
| 4,724,195 | 2/1988 | Müller et al. | 430/96 X |
| 4,734,347 | 3/1988 | Endo et al. | 430/58 X |

OTHER PUBLICATIONS

Derwent Abstract 85–001190/01 of German Patent DE 3,421,969 (Minolta).
Derwent Abstract 27147 B/14 of Japanese J54/027434 (Canon KK).

*Primary Examiner*—J. David Welsh
*Attorney, Agent, or Firm*—Bernard D. Wiese

[57] ABSTRACT

A reusable electrophotographic imaging element having a photoconductive surface layer in which the binder resin comprises a block copolyester or copolycarbonate having a fluorinated polyether block. The layer has low surface adhesion and affords improved transfer of toner images to receiver sheets.

12 Claims, 1 Drawing Sheet

ELECTROPHOTOGRAPHIC ELEMENT

FIELD OF THE INVENTION

This invention relates to electrophotography and more particularly to an electrophotographic imaging element having improved image transfer properties.

BACKGROUND OF THE INVENTION

In electrophotographic imaging processes, such as in electrophotographic copying machines employing reusable photoconductive elements an electrostatic latent-image charge pattern is formed on the photoconductive element which consists of one or more photoconductive layers deposited on a conductive support and can be in the form a belt, drum or plate. By treating the charge pattern with a dry developer containing charged toner particles, the latent image is developed. The toner pattern is then transferred to a receiver such as a sheet of paper to which it is fixed by fusion or other means.

In the most effective modern photocopiers, the photoconductive layers of the element contain organic photoconductors dispersed in a binder resin matrix. To permit long, continuous use of these reusable elements, the binder resin must be tough and strong. A problem, however, in transferring the developed image to a receiver is that the attraction of the toner to the surface layer of the electrophotographic elements which employ the usual kinds of tough organic binder resins can cause incomplete transfer of toner. The resulting transferred image on the receiver has hollow characters and other defects. The problem is especially severe when the image is transferred by pressing a receiver element such as a paper sheet into contact with the toned surface of the photoconductive element.

Efforts to solve the image-transfer problem have included providing abhesive or release coatings to the surface layers of photoconductive elements. A drawback of this attempt to solve the problem is that an insulating, non-photoconductive overcoat can interfere with the photoconductive properties of the element. If the coating is thick, it can materially reduce the electrophotographic speed or sensitivity. Even if thin, an insulating overcoat layer can shorten the life of a photoconductor to such an extent that it cannot be regenerated for repeated use. This is believed to be caused by the trapping of residual charges between the insulating coating and the photoconductive layer. If the surface is merely coated with a soft release substance such as a metal stearate, the coating rapidly wears off and the transfer problem reappears. There is a need, therefore, for a binder composition for the surface layer of photoconductive elements which provides suitable surface properties for good image transfer without the necessity for release overcoats and yet which also has the physical strength required of binders in reusable photoconductive elements and moving belts. Additionally, it is advantageous for such a binder resin to be compatible with the formation of high-speed aggregate photoconductive compositions such as those disclosed, e.g., in the U.S. Pat. Nos. to Light, 3,615,414; Contois, 4,350,751; Berwick et al, 4,175,960; Stephens et al, 3,679,407; Gramza et al, 3,684,502; and Contois et al, 3,873,311.

In accordance with the present invention, a novel electrophotographic element is provided which is strong enough for repeated use but from which, even after many cycles for use, toner can be transferred to a receiver element by pressure rollers or other means with minimal image defects. The novel element also permits the use of aggregate photoconductive compositions in its surface layer.

SUMMARY OF THE INVENTION

The electrophotographic imaging element of the invention has a surface layer adapted to receive an electrostatic charge latent image and to receive charged dry toner particles which form the toner image for transfer to a receiver element. The surface layer is either capable of generating and injecting charge carriers upon exposure to actinic radiation or capable of accepting and transporting injected charge carriers and contains an electrically insulating polymeric binder matrix which consists essentially of, or which includes as an additive, a block copolyester or copolycarbonate containing a fluorinated polyether block of the formula

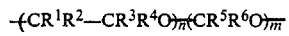

wherein each of $R^1$, $R^2$, $R^3$, $R^4$, $R^5$ and $R^6$ is fluorine or a perfluorinated lower alkyl group, and n and m are integers, the sum of which is from 10 to 100, and preferably is from 20 to 40. In preferred embodiments, the electrophotographic element is a multilayer photoconductive element.

THE DRAWING

The sole FIGURE of the drawing is an enlarged diagrammatic sectional view of a photoconductive element of the invention.

DETAILED DESCRIPTION

Figure 1:
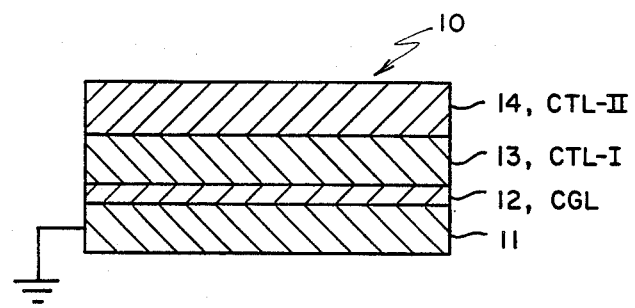

To describe the invention in more detail, reference will be made to the drawing which illustrates in cross section one type of electrophotographic imaging element of the invention, namely, a multilayer photoconductive element. This kind of element, also called a multiactive photoconductive element, has separate charge generation and charge transport layers. The configuration and principles of operation of multiactive photoconductive elements are known, having been described in a number of patents, for example, in the U.S. Pat. Nos. to Berwick et al, 4,175,960; Wright et al, 4,111,693; and Borsenberger et al, 4,578,334. The photoconductive elements of the invention can be prepared substantially as described in these patents, but using a block copolymer, as described herein, as the binder resin or as an additive in the surface layer. Also within the scope of the invention are elements in which a single photoconductive layer containing an electrically insulating block copolyester or copolycarbonate, as described, is disposed on an electrically conductive support. Another configuration suitable for the imaging elements of the invention is the inverted multilayer form in which a charge transport layer is coated on the conductive substrate and a charge generation layer is the surface layer. Examples of inverted multilayer elements are disclosed in the U.S. Pat. No. to Berwick et al, 4,175,960. In whichever configuration is selected, the block copolymer having a fluorinated polyether block is in the surface layer.

In the drawing, the photoconductive element 10 has a conductive support 11, a thin charge-generation layer 12, a relatively thick first charge-transport layer 13 and a relatively thick second charge-transport layer 14 which is the surface layer of the element. The conductive support 11 can be of conventional structure comprising, for example, a nickel-coated poly(ethylene terephthalate) film. The charge-generation and charge-transport layers comprise charge generation or charge transport materials, respectively, dispersed in an electrically insulating binder resin. These charge generation and charge transport materials in the surface and other layers of the photoconductive materials are compounds that are often referred to as photoconductors. Strictly speaking, however, with regard to the charge transport materials, although they may be photoconductors when exposed to certain wave lengths of radiation, they do not, when used in charge transport layers, necessarily function as photoconductors because they may be insensitive to the particular activating radiation for the photoconductive element. Instead, they serve to transport the charge carriers generated by the charge generation layer. The latter of course does contain photoconductors which function as much.

Most significantly, with respect to the present invention, the binder resin matrix for the photoconductive surface layer 14 comprises a block copolymer of the type referred to above, i.e., a copolyester or copolycarbonate having a fluorinated polyether block. Advantageously, the block copolymer is the sole binder resin of the surface layer but, alternatively, it can be an additive for the binder resin, comprising, e.g. from about 10 to 100 weight percent of the total electrically insulating binder resin matrix. In either event, this block copolymer provides improved surface properties, in particular, an improved toner image transfer capability. Furthermore, it is compatible with the desired functions of the charge generation or charge transport materials. In addition, it has the strength and toughness required of binder resins in reusable photoconductive films and is compatible with the formation of aggregate high-speed organic photoconductors within the binder matrix.

The block copolyesters or copolycarbonates which are present in the surface layer can be made by copolymerizing polyester or polycarbonate monomers with a fluorinated polyether oligomer which is endcapped with functional groups for condensation reactions. These polyether oligomers are of the general formula:

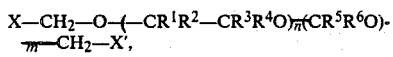

wherein the R groups and n and m are as indicated above and X and X' are the same or different functional groups for condensation reactions such as —OH, —COOH, —COHal, (Hal being halogen, preferably Cl or Br), —NCO or —NH$_2$. Preferably, the R groups are fluorine but one or more of the R groups can be perfluorinated lower alkyl groups such as trifluoromethyl, pentafluoroethyl or nonafluoro-n-butyl. Although, the molecular weight of the fluorinated polyether oligomer can vary over a considerable range, the preferred oligomers as precursors for the block copolymers are of relatively low molecular weight, e.g., $Mn=500$ to 5000, and are liquid at room temperature.

The block copolymer contains polyester or polycarbonate segments and fluorinated polyether segments. The polyester and polycarbonate segments can be selected from a range of polymer types that are suitable as binder resins for charge transport or charge generation surface layers. Suitable types include poly(bisphenol-A carbonate), poly(tetramethylcyclobutylene carbonate) and poly(arylene-) or poly(alkylene phthalates) such as poly(ethylene terephthalate), poly(tetramethylene terephthalate), poly(tetramethylene isophthalate), poly(tetramethylene-glyceryl terephthalate), poly(hexamethyleneterephthalate), poly(1,4-dimethylolcyclohexane terephthalate), poly(p-benzenediethyl terephthalate), poly(bisphenol-A terephthalate), poly(4,4'-(2-norbornylidene)diphenol terephthalate), poly(4,4'-(hexahydro-4,7-methanoindan-5-ylidene) diphenol terephthalate) or isophthalate, and others such as poly(tetramethylene-2,6-naphthalene dicarboxylate), poly(xylylene-2,6-naphthalene dicarboxylate), poly(ethylene adipate), and poly[ethylene bis(4-carboxyphenoxyethane)]. Preferably this segment is a complex polyester formed from one or more diacids (by which term we mean to include the esterification equivalents such as acid halides and esters) and one or more diols, e.g., from dimethyl terephthalate, 2,2-norbornanediylbis-4-phenoxyethanol and 1,2-ethanediol or from a terephthaloyl halide, an azelaoyl halide and 4,4'-(2-norbornylidene)bisphenol. Other useful polyester blocks include the polyesters disclosed, e.g., in the U.S. Pat. No. to Berwick et al, 4,284,699. When the imaging element has the inverse multilayer configuration in which the charge generating layer is the surface layer, as in U.S. Pat. No. 4,175,960, the preferred polyesters and polycarbonates are those which permit the formation of aggregate photoconductive compositions as previously mentioned such as those disclosed, e.g., in the U.S. Pat. Nos. to Light, 3,615,414; Contois, 4,350,751; Berwick et al, 4,175,960; Stephens et al, 3,679,407; Gramza et al, 3,684,502; and Contois et al, 3,873,311.

In preparing the block copolymer, the polymerization reaction of the oligomer and the polyester or polycarbonate monomers can be carried out by any of the usual techniques such as bulk polymerization or solution polymerization. To achieve optimum results with the preferred fluorinated polyether oligomer having a molecular weight (Mn) from about 500 to 5000 the amount of the oligomer should be sufficient to form from about 5 to 50 weight percent of the resulting block copolymer, and preferably from about 10 to 30 weight percent. The amount of oligomer employed in the reaction should be sufficient to provide the desired surface properties but not so much as to reduce the physical strength of the ultimate binder matrix excessively. The exact amount will depend on the desired balance of these properties and also on whether the block copolymer is the sole binder in the binder matrix or is blended as an additive with another binder resin.

When the block copolymer is used as an additive with another binder resin in the surface layer, the optimum concentration of the block copolymer will depend on several factors. These include the proportion of fluorinated polyether blocks in the copolymer, the thickness of the surface layer, and even the characteristics of the particular image transfer apparatus being employed. The amount will be selected to provide the desired transfer properties and the other desired binder properties. In general, the amount of the copolymer in the binder matrix can range from as low as about 10 weight percent to 100 percent, provided, however, that the fluorinated polyether block should comprise at least about 5 weight percent of the total binder resin matrix.

Although we do not wish to be bound by theoretical explanations of the reasons for the valuable results obtained with the compositions of the invention, a possible explanation lies in the physical nature of block copolymers as distinguished from random copolymers. In the compositions of the invention, the block copolymers are two-phase materials having fluorinated polyether blocks of such lengths that significant domains of these blocks are present at the surface of the photoconductive element or film. A substantial number of the domains have diameters of from 10 to 3000 nm. As a consequence, the copolymer gives desirable surface properties to the film, e.g., low adhesion. On the other hand, the block copolymer is superior to a blend of a polyester or polycarbonate with a fluorinated polyether such as the liquid oligomers that are useful in preparing the block copolymers. Such fluorinated polyether oligomers are not compatible with binder resins normally suitable for the surface layers of reusable photoconductive elements. The oligomer would migrate to the surface of the binder and would soon be lost and would also interfere with the photosensitivity of the element. Likewise, a random copolymer of polyester or polycarbonate monomers and fluorinated polyether monomer would not give the desired results. The random copolymer would have properties that could be considered an average of the properties of the individual homopolymers. For instance, the random copolymer would not have the physical strength of the polyester homopolymer nor the release properties of the fluorinated polyether block copolymer.

In contrast, in the block copolymers used in accordance with the present invention, the polyester or polycarbonate segments form a continuous phase which gives the needed physical strength, and the polyether blocks form a discontinuous phase and provide the desired surface properties. Furthermore, these results can be obtained when using the block copolymer as the sole binder resin in the surface layer or when using it as an additive with one or more other binder resins. In the latter instance, polyester or polycarbonate segments are chosen which are compatible with and which anchor the copolymer in the rest of the binder resin matrix. The fluorinated polyether domains then provide the desired surface properties without migrating or exuding from the matrix.

When used for electrophotographic imaging, the surface layer 14 of element 10 is charged in the dark to a suitable voltage, e.g., a negative voltage of 600 volts. The charged element is exposed imagewise to a pattern of actinic radiation such as visible light, causing charges in the exposed areas of the surface layer to dissipate. The surface is then contacted with finely divided particles of a charged dry toner such as pigmented thermoplastic resin particles to develop the electrostatic-charge latent image.

Because this is a reusable imaging element, the toner image is then transferred to a paper sheet or other receiver sheet where it is fixed by heat, pressure or other means. The transfer can be accomplished by pressing the receiver sheet into contact with the toned surface of the photoconductive element, e.g., by passage through the nip of pressure rollers, which are suitably electrically biased to attract the charged toner particles from the photoconductive layer to the paper.

As already indicated, toner-transfer techniques in the past have been more or less inefficient. Surface forces holding the toner to the photoconductive layer have caused incomplete transfer of the toner and image defects have resulted, of which the "hollow character" defect has been especially serious. According to theory, the hollow-character defect is caused by the cohesion of toner particles to each other and their adhesion to the photoconductor when compressed by a pressure roller during the image-transfer operation. The toner particles appear to compact into aggregates of which only the edges transfer readily, thus forming hollow characters on the receiving substrate. The defect is particularly evident at the edges of dense solid areas, and in the centers of fine lines and alphanumeric characters, which contain little toner. If severe enough, the image becomes unreadable.

It should be understood that, in addition to the principal layers which have been discussed, i.e., the conductive substrate and the charge generation and charge transport layers, the photoconductive elements of the invention can also contain other layers of known utility, such as subbing layers to improve adhesion of contiguous layers and barrier layers to control unwanted charge transport. The surface layer can even have a thin release coating such as a thin coating of silicone oil or of fluorocarbon polymer or the like if it is desired to augment the release qualities provided by the particulate adhesive substance dispersed within the surface layer. Any such coating however, should be sufficiently thin that, as an insulating, nonphotoconductive substance, it does not substantially reduce the electrophotographic sensitivity of the element.

The invention is further illustrated by the following examples which describe the preparation of fluorinated polyether block copolymers and of photoconductive films containing such copolymers.

COPOLYMER SYNTHESIS

Example 1

Preparation of Block Copolymer of Fluorinated Polyether Oligomer with Poly(ethylene-co-2,2'-(2-norbornylidenebis(p-phenyleneoxy)diethylene)terephthalate)

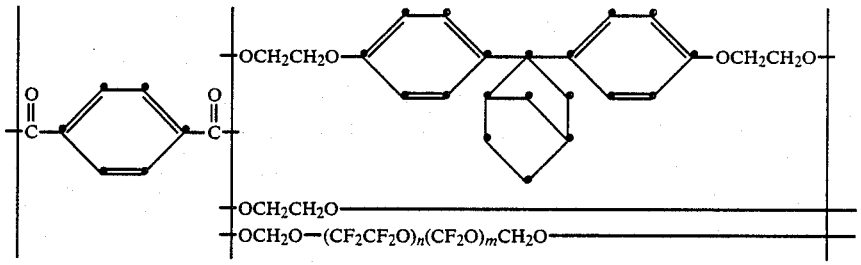

The following starting materials and procedure were used in the preparation of the above copolymer:

| Starting Materials | Amount (g) | Mols. | Mn. |
|---|---|---|---|
| dimethyl terephthalate | 19.4 | 0.1 | 1944 |

-continued

| Starting Materials | Amount (g) | Mols. | Mn. |
|---|---|---|---|
| 2,2-norbornanediylbis-4-phenoxyethanol | 20.2 | 0.05 | 404 |
| 1,2-ethanediol | 4.4 | 0.072 | 62 |
| F—polyether* | 12.0 | — | ~2000 |

*"Dynamar FC2202" fluorinated polyether obtained from 3M Company, a hydroxyl-encapped oligomer of the formula, $HOCH_2-O-(CF_2CF_2O)_n(CF_2O)_mCH_2OH$ To a 100 ml polymerization flask was charged 19.4 g (0.1 mole) dimethyl terephthalate, 20.2 g (0.05 mole) 4,4-(hexahydro-4,7-methanoinden-5-ylidene)-bis-4-phenoxy-ethanol, 4.4 g (0.072 mole) 1,2-ethanediol, and 12.0 g of the fluorinated polyether oligomer which for brevity, is listed above as "F-polyether". The contents of the flask were heated under a nitrogen atmosphere to 220° C., four drops of tetraisopropyl titanate added, and a Claisen head attached. The reaction mixture was heated at 200° C. for two hours followed by one hour at 240° C. The Claisen head was removed and the reaction mixture was heated at 240° C. for an additional hour. The flask was then attached to vacuum, 100 μm, and heated with stirring at 240° C. for three hours. Combustion analysis found: C, 63.8%; H, 4.5%; F, 8.1%.

COPOLYMER SYNTHESIS

Example 2

Preparation of Block Copolymer of F-Polyether with Poly(4,4'-(2-norbornylidene)bisphenyleneazelate-co-terephthalate)

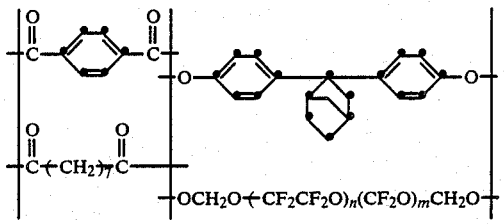

| Starting Materials | Amount (g) | Mols. | Mn. |
|---|---|---|---|
| terephthaloyl chloride | 5.7 | 0.028 | 203 |
| azelaoyl chloride | 4.2 | 0.019 | 225 |
| 4,4'-(2-norbornylidene)-bisphenol | 10.5 | 0.038 | 280 |
| triethylamine | 13.5 | 0.133 | 101 |
| F—polyether | 2.5 | — | ~2000 |

To a 500 ml three neck round bottom flask equipped with argon inlet, mechanical stirrer and addition funnel was charged 2.5 g F-polyether, 20 ml 1,1,2-trifluoro-1,2,2-trichloroethane, 60 ml dichloromethane, 13.5 g (0.133 mole) triethylamine, and 10.5 g 4,4'-(2-norbornylidene)bisphenol. The reaction mixture was cooled in an ice-bath and a solution of 5.7 g (0.028 mole) terephthaloyl chloride and 4.2 g (0.019 mole) azelaoyl chloride in 40 ml dichloromethane was added dropwise over a period of an hour. The ice-bath was then removed and the reaction stirred at room temperature for 12 hours. A solution of 0.6 g terephthaloyl chloride and 0.4 g azelaoyl chloride in 40 ml of dichloromethane was slowly added to the reaction mixture. A noticeable increase in the reaction mixture viscosity was observed after 25 ml of the acid chloride solution had been added. The reaction mixture was diluted with 100 ml dichloromethane and the remaining acid chloride solution. The reaction was diluted with 500 ml dichloromethane and washed with 1 liter of 0.1N HCl, followed with several water washes until neutral. The polymer dope was precipitated in 4 liters of methanol and the precipitate was collected and dried overnight in vacuum at 40° C. Yield 18 g. Theor. % Fluorine 7.7%. Found: 6.4% Fluorine. GPC, Mn=19,821.

The next example describes the preparation of a control photoconductive film (A) and of two photoconductive films (B & C) of the present invention.

Example 3

Photoconductive Film

Three multilayer photoconductive films, designated as films A, B and C, were prepared. For each the support or base was a nickelized polyethyleneterephthalate film. On each support was coated a charge generation layer (CGL) on which was coated a first charge transport layer (CTL-I). On the latter was coated from a dispersion in dichloromethane, a second charge transport layer (CTL-II), which in each case was the surface layer of the film. Compositions of the different layers of the three films were as follows (parts are by weight):

Film A (Control)
CTL-II: 3.86 g/m² (0.36 g/ft²) dry coverage:
Binder: 60 parts
poly(4,4'-(2-norbornylidene)-bisphenylene azelate-co-terephthalate) (60:40)
Charge Transport Materials:
   (a) 40 parts 1,1-bis(4-di-p-tolylaminophenyl)-3-phenylpropane, and
   (b) 0.25 parts bis(4-diethylamino)tetraphenylmethane.
CTL-I: 25.8 g/m² (2.4 g/ft²) dry coverage:
Binder: 60 parts polycarbonate ("Lexan 145" polymer of General Electric Co.)
Charge Transport Materials: Same as in CTL-II.
CGL:
Charge Transport Materials: 280 nm thick layer of 2,9-bis-(2-phenylethyl)anthra(2,9,9-DEF: 6,5,10-d'e'f')diisoquinoline-1,3,8,10(2H,9H)-tetrone.

Film B
Same as Film A, except that CTL-II (the surface layer) is replaced with 4.3 g/m² (0.40 g/ft²) dry coverage of a layer composed of:
Binder: 60 parts of the block copolymer (10 wt% F-polyether) of Synthesis Example 2; and
Charge Transport Materials:
   (a) 20 parts of 1,1-bis(4-di-p-tolylaminophenyl)cyclohexane,
   (b) 19.75 parts of tri-p-tolylamine, and
   (c) 0.25 parts of bis(4-diethylamino)tetraphenylmethane.

Film C
Same as Film A except that CTL-II (the surface layer) is replaced with 4.3 g/m² (0.40 g/ft²) dry coverage of a layer composed of:
Binder: 60 parts of the block copolymer formed as in Synthesis Example 1 and containing 10 weight % F-polyether, and
Charge Transport Materials: Same as Film B.

Films A, B and C were tested for speed of photodecay by exposure to radiation of 630 nm wavelength and for regeneration capability by recharging to −500 volts. The speed results are given in the following table.

| Films | Photodecay Speed −500 to −100 V. erg/cm$^2$ |
|---|---|
| A (Control) | 3.4 |
| B | 4.0 |
| C | 3.5 |

These results show that with regard to electrophotographic speed the films of the present invention (B and C) were equivalent to the control film which contained no fluorinated polyether block copolymer in the surface layer. Likewise, in regeneration tests the films of the invention were equivalent to the control. Thus, the electrophotographic elements of the invention while providing other advantages to be discussed below, do not sacrifice the desirable qualities of speed and regenerability.

Sensitometric and Image Transfer Tests

Three photoconductive films of the invention were prepared which were similar to Film C above except that the concentrations of the fluorinated polyether block in the copolymer binder for CTL-II varied. The ratios of binder to charge transport material and the dry coverage of the coatings in CTL-II were as in Films B and C. The dry coverage of the CTL-I layers was 15.1 g/m$^2$ (1.4 g/ft$^2$) and these layers contained 60 parts of the binder, poly(4,4'-(2-norbornylidene)bisphenylene azelate-co-terephthalate (60:40) and of the same charge transport materials as in Film B, above, 34.8 parts of (a), 5.2 parts of (b), and 0.25 parts of (c). A control Film G was also prepared which was like Films D, E and F except that the fluorinated polyether-containing binder resin of CTL-II was replaced with a polyester of the same acids and diols but having no fluorinated polyether block. The binders for Films D, E and F were as follows:

Film D—Same as Film C, i.e., 10 weight % F-polyether.
Film E—Same as Film C, but 20 weight % F-polyether.
Film F—Same as Film C but 30 weight % F-polyether.

The results of sensitometric tests of these three films of the invention and of the control are as follows:

| Films | Photodecay Speed −500 to −100 V. (erg/cm$^2$) |
|---|---|
| D | 3.3 |
| E | 3.5 |
| F | 3.4 |
| G (Control) | 3.2 |

Films D, E and F were also tested for low surface adhesion in a modified commercial electrophotographic copying apparatus which was equipped with a magnetic brush developing station and a roller transfer station which employed a two-component developer of the type disclosed in the U.S. Pat. No. to Miskinis et al, 4,546,060. The toner as a black pigmented thermoplastic polyester powder and the transfer pressure was 89.6 kPa (13 psi). A test document having a variety of type sizes, fonts and resolution targets was copied. Transfer of toner was tested for three kinds of paper, i.e., bond, gloss and clay-coated. The test conditions were relatively severe in order to emphasize the difference between the materials being tested. A subjective rating was given to each of the films for initial transfer of toner to paper and for transfer after 2,000, 4,000 and 6,000 copies. The rating scale was: (1) no hollow character: (2) isolated hollow character; (3) systematic hollow character; and (4) extensive hollow character. The following table lists the test ratings.

| Film | Paper | Initial | 2K | 4K | 6K |
|---|---|---|---|---|---|
| D | Bond | 1 | 1 | 1 | — |
|  | Gloss | 1 | 4 | 4 | — |
|  | Clay-coated | 1 | 3 | 3 | — |
| E | Bond | 1 | 1 | 1 | 1 |
|  | Gloss | 1 | 1 | 3 | 3 |
|  | Clay-coated | 1 | 1 | 1 | 3 |
| F | Bond | 1 | 1 | 1 | 1 |
|  | Gloss | 1 | 1 | 3 | 3 |
|  | Clay-coated | 1 | 1 | 1 | 2 |

In contrast to these results with the three films of the invention, the control, Film G, had a rating of 4 after only 200 transfers.

The following example describes the preparation of a binder resin useful in accordance with the invention, which is a polycarbonate block copolymer.

COPOLYMER SYNTHESIS

EXAMPLE 4

Preparation of Block Copolymer of F-Polyether with Poly(oxycarbonyloxy-1,4-phenyleneisopropylidene-1,4-phenylene).

The following starting materials and procedure were used in the preparation of the copolymer:

| Starting material | Amount (g) | Mols. | Mn |
|---|---|---|---|
| Diphenylcarbonate | 21.4 | 0.1 | 214 |
| 4,4'isopropylidenediphenol | 22.8 | 0.1 | 228 |
| F—Polyether | 13 | — | ~2000 |

To a 100 ml polymerization flask was charged 21.4 g (0.1 mole) diphenylcarbonate, 22.8 g (0.1 mole) 4,4-isopropylidenediphenol, and 13 g of fluorinated polyether, and a Claisen head attached. The content of the flask was heated under nitrogen atmosphere at 250° C. for one and a half hours. The temperature was then increased to 275° C. for a period of one hour, followed by an additional increase in temperature to 300° C. for a period of one-half hour. The Claisen head was then removed and attached to vacuum, 100 μm, and polymerized at 325° C. for two hours. The contents of the cooled flask were dissolved in dichloromethane and precipitated into methanol. Combustion Analysis found: C, 68.2%; H, 4.9%; F, 7.7%. Inherent Viscosity: 0.84 dl/g (dichloromethane).

A photoconductive element using the binder of Example 4 in its surface layer was superior in image transfer properties and compared favorably in sensitometric tests with a known type of element in which the binder was "Lexan 145" polycarbonate, a product of General Electric Company.

Although the examples have described specific charge generation and charge transport layer compositions, it should be understood that the photoconductive elements of the invention can employ a wide range of charge generation and charge transport materials in the surface layers and other layers of the photoconductive elements.

Specific compounds useful as charge transport or charge generation materials, besides those used in the examples, are well known and have been disclosed in many pantents and other publications. The U.S. Pat. Nos. to Berwick et al, 4,175,960 and Borsenberger et al, 4,578,334, for example, describe in detail various classes of p-type and n-type organic photoconductors that are useful as charge transport materials in elements of the present invention. Among others, they disclose polyarylamines and polyaryl methanes that are especially useful. Likewise, they disclose a wide range of useful charge generating photoconductors, including the heterogeneous or aggregate photoconductors which are dye-binder cocrystalline complexes formed with pyrylium-type sensitizing dyes of the types disclosed in the U.S. Pat. No. to Light, U.S. Pat. No. 3,615,414, the U.S. Pat. No. to Gramza et al, U.S. Pat. No. 3,732,180; and the patent to Fox et al, U.S. Pat. No. 3,706,554. These are especially preferred for the charge generating layer. An important advantage of the present invention when the charge generating layer is the surface layer is that the block copolymers used in the surface layer are compatible with the formation of such aggregate photoconductors. Other charge generating photoconductors are also suitable, however, within the scope of the invention including the phthalocyanine photoconductors of Borsenberger et al, U.S. Pat. No. 4,578,334; the organic photoconductors of Rossi, U.S. Pat. No. 3,767,393; Fox, U.S. Pat. No. 3,820,989; Rule, U.S. Pat. No. 4,127,412; and Borsenberger et al, U.S. Pat. No. 4,471,039; and the various photoconductive materials described in Research Disclosure, No. 10938, published May 1973, pages 62 and 63.

Binders in the charge generation and charge transport layers of the imaging elements of the invention, including the block copolymers employed in the surface layer, are film forming polymers having a fairly high dielectric strength and good electrical insulating properties. Examples of suitable binder resins for layers other than the surface layer include butadiene copolymers; polyvinyl toluene-styrene copolymers; styrene-alkyd resins; silicone-alkyd resins; soya-alkyd resins; vinylidene chloride-vinyl chloride copolymers; poly(vinylidene chloride); vinylidene chloride-acrylonitrile copolymers; vinyl acetate-vinyl chloride copolymers; poly(vinyl acetals) such as poly(vinyl butyral); nitrated polystyrene; polymethylstyrene; isobutylene polymers; polyesters such as poly[ethylene-co-alkylenebis-(alkylene-oxyaryl)phenylenedicarboxylate]; phenol formaldehyde resins; ketone resins; polyamides; polycarbonates; polythiocarbonates; poly[ethylene-co-isopropylidene-2,2-bis(ethyleneoxyphenylene)terephthalate]; copolymers of vinyl haloacrylates and vinyl acetate such as poly(vinyl-m-bromobenzoate-co-vinyl acetate); chlorinated poly(olefins) such as chlorinated poly(ethylene); etc.

Polymers containing aromatic or heterocyclic groups are most effective as binders because they provide little or no interference with the transport of charge carriers through the layer. Heterocyclic or aromatic containing polymers especially useful in p-type charge transport layers include styrene-containing polymers, bisphenol A polycarbonate polymers, phenol formaldehyde resins, polyesters such as poly[ethylene-co-isopropylidene-2,2-bis(ethyleneoxyphenylene)]terephthalate and copolymers of vinyl haloacrylates and vinyl acetate.

Especially useful binders for either the charge generation or charge transport layers are polyester resins and polycarbonate resins such as disclosed in the U.S. Pat. Nos. to Merrill 3,703,372; 3,703,371 and 3,615,406, the patent to Berwick et al 4,284,699 and the U.S. Pat. Nos. to Gramza et al, 3,684,502 and Rule et al, 4,127,412. Such polymers can be used in the surface layer in admixture with the block copolymers and copolycarbonates which are employed in the imaging elements of the invention.

The charge generation and charge transport layers can also contain other addenda such as leveling agents, surfactants and plasticizers to enhance various physical properties. In addition, addenda such as contrast control agents to modify the electrophotographic response of the element can be incorporated in the charge transport layers.

The charge generation layers and the charge transport layer can be formed by solvent coating, the components of the layer being dissolved or dispersed in a suitable liquid. Useful liquids include aromatic hydrocarbons such as benzene, toluene, xylene and mesitylene; ketones such as acetone and butanone; halogenated hydrocarbons such as methylene chloride, chloroform and ethylene chloride; ethers including cyclic ethers such as tetrahydrofuran; ethyl ether; and mixtures of the above. Vacuum deposition is also a suitable method for depositing certain layers. The compositions are coated on the conductive support to provide the desired dry layer thicknesses. The benefits of the invention are not limited to layers of any particular thicknesses and they can vary considerably, e.g., as disclosed in the cited prior art references. In general, the charge transport layers are thicker than the charge generation layers, e.g., from 5 to 200 times as thick or from about 0.1 to 15 $\mu$m dry thickness, particularly 0.5 to 2 $\mu$m. Useful results can also be obtained when the charge transport layers are thinner than the charge generation layer.

The improved image transfer properties are obtained in accordance with the invention with a wide range of dry toners and development techniques. The toners can be applied by any dry development technique including magnetic brush development or other development method using single component developers or two component developers with carrier particles. Useful toner include powdered pigmented resins made from various thermoplastic and thermoset resins such as polyacrylates, polystyrene, poly(styrene-co-acrylate), polyesters, phenolics and the like, and can contain colorants such as carbon black or organic pigments or dyes. Other additives such as charge-control agents and surfactants can also be included in the toner formulation.

Examples of suitable toner compositions include the polyester toner compositions of U.S. Pat. No. 4,140,644; the polyester toners having a p-hydroxybenzoic acid recurring unit of U.S. Pat. No. 4,446,302; the toners containing branched polyesters of U.S. Pat. No. 4,217,440 and the crosslinked styrene-acrylic toners and polyester toners of U.S. Pat. No. Re. 31,072; the phosphonium charge agents of U.S. Pat. Nos. 4,496,643 and the ammonium charge agents of U.S. Pat. Nos. 4,394,430; 4,323,634 and 3,893,935. They can be used with plural component developers with various carriers such as the magnetic carrier particles of U.S. Pat. No.

4,546,060 and the passivated carrier particles of U.S. Pat. No. 4,310,611.

While the avoidance of the hollow-character defect has been discussed, it should be understood that electrophotographic elements of the invention, because of their excellent toner-transfer quality, provide other advantages. These include, for example, avoidance or reduction of mottle and of the so-called "halo" defect in multicolor images. Other advantages include the lessening of toner scumming on the surface of the photoconductive element, with consequent easier cleaning of the element between development cycle, which in turn results in longer film life.

Because they are physically strong and because they resist toner scumming and can readily be cleaned between imaging cycles, the photoconductive elements of the invention are especially valuable as reusable photoconductive elements, and they have been referred to as such herein. They can if desired, however, also be used as expendable or non-reusable photoconductive elements.

The invention has been described with reference to certain preferred embodiments, but it will be understood that variations and modifications can be made within the spirit and scope of the invention.

I claim:

1. An electrophotographic imaging element comprising a conductive support and a surface layer that is either capable of generating and injecting charge carriers upon exposure to actinic radiation or capable of accepting and transporting injected charge carriers, said surface layer having an electrically insulating binder resin matrix which comprises a block copolyester or copolycarbonate having a fluorinated polyether block of the formula,

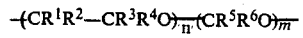

wherein each of $R^1$, $R^2$, $R^3$, $R^4$, $R^5$ and $R^6$ is fluorine or a perfluorinated lower alkyl group, n and m are integers and the sum of n plus m is from 10 to 100.

2. An element according to claim 1, wherein the weight percent of the fluorinated polyether block in the block copolymer is in the range from about 5 to 50.

3. An element according to claim 2 wherein the copolymer has a polyester segment which is a complex polyester derivative of one or more dicarboxylic acids and one or more diols, at least one of the acids being an aromatic dicarboxylic acid.

4. An element according to claim 1 wherein the binder resin matrix consists essentially of said block copolymer.

5. An element according to claim 1 wherein the binder resin matrix comprises a blend of polyester or polycarbonate binder resin and said block copolymer in an amount sufficient to provide an amount of the fluorinated polyether block in the binder resin matrix comprising at least about 5 weight percent of the binder resin matrix.

6. An element according to claim 1 wherein the element is a multilayer element.

7. An element according to claim 1 wherein the surface layer contains an organic aggregate photoconductive composition.

8. An element according to claim 6 comprising in sequence a conductive support, a charge generation layer, a first charge transport layer and, as the surface layer, a second charge transport layer.

9. An element according to claim 8 wherein the charge generation layer contains an aggregate photoconductive composition.

10. An element according to claim 9 wherein the surface layer contains a tetraarylmethane or a triarylamine dispersed in the block copolyester or copolycarbonate.

11. An element according to claim 1 wherein the binder resin matrix of the surface layer comprises a block copolyester or block copolycarbonate made by copolymerizing polyester or copolycarbonate monomers with a fluorinated polyether oligomer of the formula,

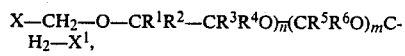

wherein the R groups and n and m are as in claim 1 and X and $X^1$ are functional groups for condensation reactions.

12. An element according to claim 6 comprising in sequence a conductive support, a charge transport layer and, as the surface layer, a charge generation layer containing an aggregate photoconductive composition.

* * * * *

UNITED STATES PATENT OFFICE
CERTIFICATE OF CORRECTION

PATENT NO. : 4,772,526
DATED : September 20, 1988
INVENTOR(S) : Hsin-Chia Kan and Joseph A. Pavlisko It is certified that error appears in the above-identified patent and that said Letters Patent is hereby corrected as shown below:

At column 14, lines 36-39, "$X-CH_2-O-CR^1R^2-CR^3R^4O)_{\overline{n}}(CR^5R^6O)_mCH_2-X^1,$" should read --$X-CH_2-O-(CR^1R^2-CR^3R^4O)_{\overline{n}}(CR^5R^6O)_{\overline{m}}CH_2-X^1,$-- (Claim 11)

Signed and Sealed this

Thirtieth Day of May, 1989

Attest:

DONALD J. QUIGG

Attesting Officer

Commissioner of Patents and Trademarks